US012792046B2

(12) United States Patent
Rezvani et al.

(10) Patent No.: US 12,792,046 B2
(45) Date of Patent: Nov. 10, 2026

(54) USER INTERFACE FOR CREATION OF FLIGHT RESTRICTIONS ON UAV OPERATIONS BASED ON NON-DIGITAL DATA INPUTS

(71) Applicant: WING AVIATION LLC, Palo Alto, CA (US)

(72) Inventors: Tara S. Rezvani, Los Gatos, CA (US); Jonathan Kaplan, Waltham, MA (US); Reinaldo Negron, Jr., San Francisco, CA (US); Simon Davey, San Francisco, CA (US); Fan Zhang, San Francisco, CA (US); Vishnu Rajendran, Los Gatos, CA (US)

(73) Assignee: Wing Aviation LLC, Palo Alto, CA (US)

( * ) Notice: Subject to any disclaimer, the term of this patent is extended or adjusted under 35 U.S.C. 154(b) by 76 days.

(21) Appl. No.: 18/917,385

(22) Filed: Oct. 16, 2024

(65) Prior Publication Data

US 2025/0208622 A1 Jun. 26, 2025

Related U.S. Application Data

(60) Provisional application No. 63/612,833, filed on Dec. 20, 2023.

(51) Int. Cl.

*G06F 3/04883* (2022.01)
*G05D 1/229* (2024.01)

(Continued)

(52) U.S. Cl.

CPC ....... *G05D 1/2295* (2024.01); *G06F 3/04883* (2013.01); *G08G 5/32* (2025.01); *G08G 5/34* (2025.01)

(58) Field of Classification Search

CPC .......... G05D 1/2295; G08G 5/32; G08G 5/34; G06F 3/04883

(Continued)

(56) References Cited

U.S. PATENT DOCUMENTS 10,008,123 B2 6/2018 Chen
10,403,161 B1 9/2019 Bry et al.

(Continued)

FOREIGN PATENT DOCUMENTS

EP 3251108 B1 7/2019

OTHER PUBLICATIONS

Grigoropoulos, Flexible Deployment and Enforcement of Flight and Privacy Restrictions for Drone Applications, Jul. 2, 2020, IEEE, 2020 50th Annual IEEE/IFIP International Conference on Dependable Systems and Networks Workshops (DSN-W) (Year: 2020).*

(Continued)

*Primary Examiner* — Matthias S Weisfeld
(74) *Attorney, Agent, or Firm* — Christensen O'Connor Johnson Kindness PLLC

(57) ABSTRACT

A technique for managing an airspace used by a fleet of UAVs includes presenting a user interface (UI) adapted for creating an airspace restriction based on non-digitized information available to a human supervisor and input into the UI by the human supervisor, soliciting with a selectable field of the UI a restriction type for the airspace restriction from a plurality of available restriction types, soliciting with duration fields of the UI start and end times for the airspace restriction, soliciting with location fields of the UI a location of the airspace restriction, creating a new entry for the airspace restriction in a restriction data store based on the selectable, duration, and location fields, and creating a new flight mission or altering an existing flight mission based upon the airspace restriction.

23 Claims, 9 Drawing Sheets

(51) Int. Cl.
*G08G 5/32* (2025.01)
*G08G 5/34* (2025.01)

(58) Field of Classification Search
USPC .......................................................... 701/120
See application file for complete search history.

(56) References Cited

U.S. PATENT DOCUMENTS

| | | | | |
|---|---|---|---|---|
| 10,733,895 | B2 * | 8/2020 | Liu | B64C 39/024 |
| 11,749,121 | B2 | 9/2023 | Rezvani et al. | |
| 2004/0010720 | A1 * | 1/2004 | Singh | H04H 60/95<br>709/224 |
| 2016/0253907 | A1 * | 9/2016 | Taveira | G01C 21/20<br>701/3 |
| 2018/0024549 | A1 * | 1/2018 | Hurd | A01B 69/008<br>701/2 |
| 2018/0204469 | A1 | 7/2018 | Moster et al. | |
| 2020/0068584 | A1 * | 2/2020 | Matsuki | G05D 1/0022 |
| 2020/0250997 | A1 | 8/2020 | Hegranes et al. | |
| 2021/0312817 | A1 | 10/2021 | Stewart | |
| 2021/0327286 | A1 | 10/2021 | Stewart | |
| 2022/0229449 | A1 | 7/2022 | Telles et al. | |
| 2022/0415188 | A1 | 12/2022 | Zhang | |
| 2023/0045977 | A1 * | 2/2023 | Liu | B64C 39/024 |

OTHER PUBLICATIONS

Temporary Flight Restrictions | NBAA—National Business Aviation Association, downloaded Nov. 1, 2023 from; https://nbaa.org/aircraft-operations/airspace/alerts/notams-and-tfrs/temporary-flight-restrictions/.

PCT International Search Report and Written Opinion mailed Nov. 13, 2025, in corresponding PCT Application No. PCT/US2024/051540, 9 pages.

* cited by examiner

USER INTERFACE FOR CREATION OF FLIGHT RESTRICTIONS ON UAV OPERATIONS BASED ON NON-DIGITAL DATA INPUTS

CROSS-REFERENCE TO RELATED APPLICATIONS

This application claims priority to U.S. Provisional Application No. 63/612,833, filed on Dec. 20, 2023.

TECHNICAL FIELD

This disclosure relates generally to unmanned vehicles, and in particular but not exclusively, relates to collecting and/or disseminating information for restricting airspace of unmanned aerial vehicles.

BACKGROUND INFORMATION

An unmanned vehicle, which may also be referred to as an autonomous vehicle, is a vehicle capable of traveling without a physically present human operator. Various types of unmanned vehicles exist for various different environments. For instance, unmanned vehicles exist for operation in the air, on the ground, underwater, and in space. Unmanned vehicles also exist for hybrid operations in which multi-environment operation is possible. Unmanned vehicles may be provisioned to perform various different missions, including payload delivery, exploration/reconnaissance, imaging, public safety, surveillance, or otherwise. The mission definition will often dictate a type of specialized equipment and/or configuration of the unmanned vehicle.

Unmanned aerial vehicles (also referred to as drones) may be adapted for package delivery missions to provide an aerial delivery service. One type of unmanned aerial vehicle (UAV) is a vertical takeoff and landing (VTOL) UAV. VTOL UAVs are particularly well-suited for package delivery missions. The VTOL capability enables a UAV to takeoff and land within a small footprint thereby providing package pick-ups and deliveries almost anywhere. To safely deliver packages in a variety of environments (particularly populated urban/suburban environments), a UAV delivery service should be capable of quickly and efficiently reacting to a variety of different sources of information that may impact operational airspace.

BRIEF DESCRIPTION OF THE DRAWINGS

Non-limiting and non-exhaustive embodiments of the invention are described with reference to the following figures, wherein like reference numerals refer to like parts throughout the various views unless otherwise specified. Not all instances of an element are necessarily labeled so as not to clutter the drawings where appropriate. The drawings are not necessarily to scale, emphasis instead being placed upon illustrating the principles being described.

DETAILED DESCRIPTION

Figure 1:
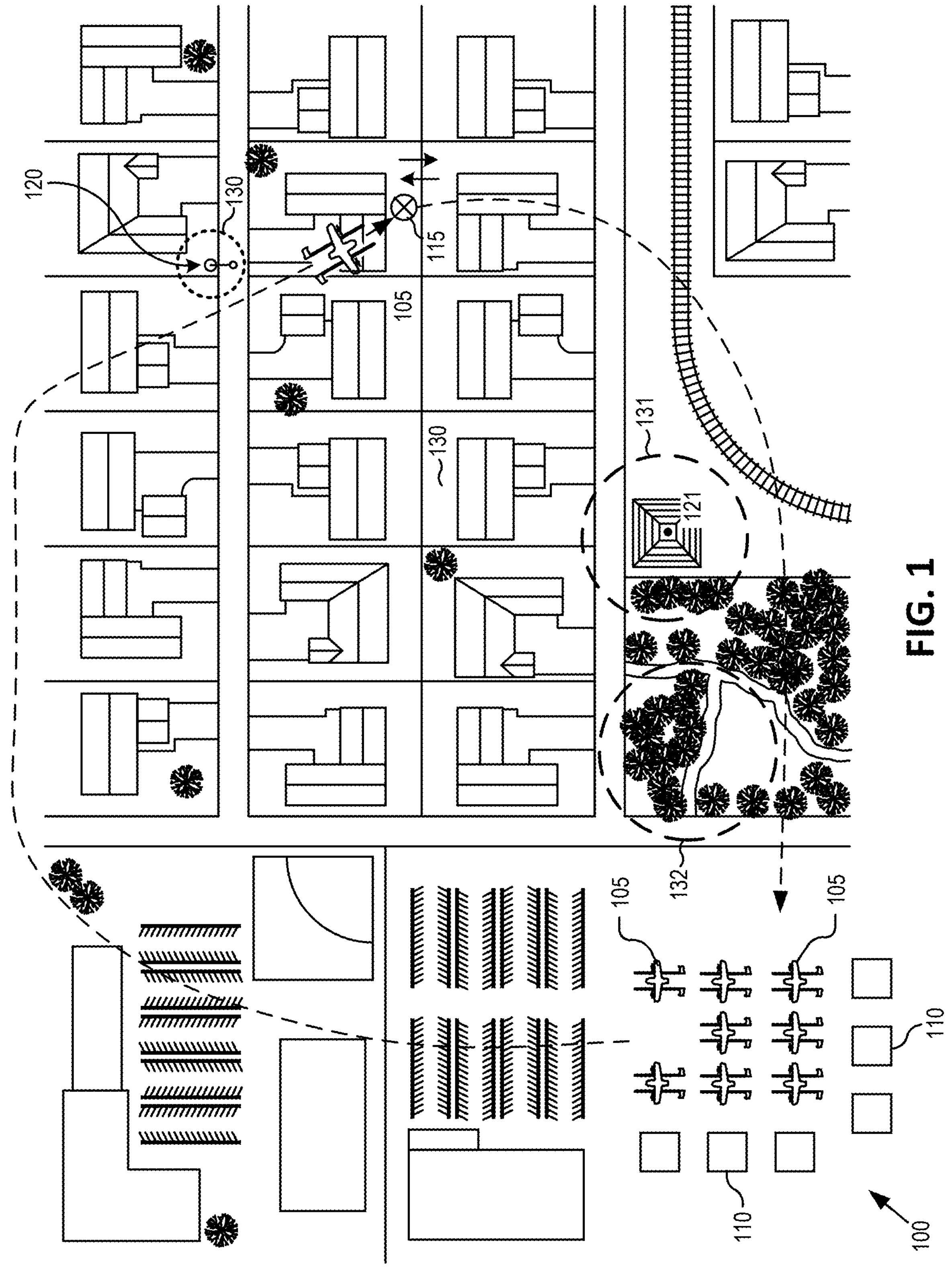
FIG. 1 illustrates operation of an unmanned aerial vehicle (UAV) delivery service that delivers packages into a neighborhood having an airspace restriction, in accordance with an embodiment of the disclosure.

Embodiments of a system, apparatus. and method for creating, editing, and otherwise managing airspace restrictions based upon non-digitized information when operating an unmanned aerial vehicle (UAV) delivery service are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

A UAV delivery service must share the airspace in which it operates with a variety of other events and objects, which may restrict free use of that airspace. Operations by other civilian or military aircraft (manned or unmanned) may place restrictions on the airspace. Similarly, events and structures on the ground may also impact the free use of that airspace. These restrictions may be permanent, semi-permanent, or temporary. As UAV delivery services expand leveraging automation to process an increasing number of delivery orders, plan routes, and execute flight missions, the ability to effectively and timely manage airspace restrictions in a scalable manner is increasingly important.

Digital data sources providing information upon which airspace restriction decisions may be made are amenable to ingestion and analysis by an automated, or semi-automated, fleet management system. The digital data feeds may be directly analyzed by a restriction determinization engine, which can immediately respond by creating new or modifying existing airspace restrictions. However, not all sources of information relevant to airspace restrictions are currently digitized. In particular, voice-based communications are often analog sources of information. This is particularly true in the aviation industry, which uses VHF frequencies for real-time pilot and air traffic control communications. Similarly, a call center may be established by the UAV delivery service to accept phone calls from stakeholders and other interested third parties. These phone calls may convey relevant, time sensitive information about events, objects, or obstacles that impact the airspace in a non-digitized format. Again, the content and nature of these phone calls may not currently lend themselves to fully automated digitization.

Embodiments of an information collection user-interface (UI) adapted for creating and/or modifying an airspace restriction based on non-digitized information available to a human supervisor are described. The information collection UI may be used by human operators (aka human supervisors) operating in a call center, or in other command and control capacities, that monitor real-time aviation communications (e.g., air traffic control radio frequencies, etc.), receive calls from interested third parties, or otherwise receive information that may impact the airspace used by a fleet of UAVs. The information collection UI enables the quick and effective ingestion of non-digitized information into the fleet management system and the creation or modification of airspace restrictions based upon the non-digitized information. In various embodiments, the information collection UI includes a selectable field where a human supervisor can quickly select a restriction type for the airspace restriction from a plurality of available restriction types. The restriction types (aka restriction data types) define when or how the airspace restriction is implemented by the fleet. The information collection UI may include various other fields and features including: (1) duration fields for designating the start and end times of the airspace restriction, (2) location fields to indicate a specific two-dimensional (2D) or three-dimensional (3D) location of the airspace restriction, (3) text fillable description fields describing the obstacle or event causing the airspace restriction, and (4) a task list field for presenting, sorting, filtering, and accessing entries (e.g., tasks) for each of the airspace restrictions. These and other features are described in further details below.

FIG. 1 illustrates operation of a UAV delivery service that delivers packages into a neighborhood having one or more airspace restrictions, in accordance with an embodiment of the disclosure. UAVs may one day routinely deliver items into urban or suburban neighborhoods from small regional or neighborhood hubs such as terminal area 100 (also referred to as a local nest or staging area). Vendor facilities that wish to take advantage of the aerial delivery service may set up adjacent to terminal area 100 (such as vendor facilities 110) or be dispersed throughout the neighborhood for waypoint package pickups (not illustrated). An example aerial delivery mission may include a UAV 105 taking off from terminal area 100 with a package for delivery to a destination area 115 (also referred to as a delivery zone or drop zone), rising to a cruising altitude, and cruising to the customer destination. At destination area 115, UAV 105 descends for package drop-off before once again ascending to a cruise altitude for the return journey back to terminal area 100.

During the course of a delivery mission, ground-based obstacles or other airborne vehicles may present permanent, semi-permanent, or temporary hazards to be avoided. For example, streetlight 120 and radio tower 121 may represent permanent structures that extend into the operation airspace used by the fleet of UAVs 105. Other hazards include telephone poles, cranes, Ferris wheels, tall trees, etc. Some of these obstacles may be persistent unchanging obstacles (e.g., streetlight 120, telephone poles, and radio tower 121) while others may be temporary (cranes, Ferris wheels, etc.), or always changing (e.g., trees). Regardless, when the fleet management system becomes aware of an obstacle impacting the airspace of the fleet, airspace restrictions, such as airspace restrictions 130 and 131, should be timely created and enforced on the fleet.

In other scenarios, events occurring on the ground or in the air may also impact the airspace. For example, an outdoor public event (e.g., concert, speech, summer play, etc.) in a park or public space may result in the creation of a temporary airspace restriction, such as airspace restriction 132, so as not to disturb the live event. Similarly, flight shows, military operations, etc. represent example airborne events that may also require a temporary airspace restriction.

Each airspace restriction limits the use of the airspace in some manner. These restrictions may represent a "no go" or "fly around" restriction, where UAVs 105 are routed around an area on a 2D map (2D restriction), routed around certain locations/altitudes in a 3D map (3D restriction), or routed around certain locations/altitudes during specified times (4D restriction). Other restrictions may limit the density, frequency, or heading of flights in a 2D, 3D, or 4D restricted space and time. The restrictions may include commands of how to implement the airspace restrictions such as land now, fly around, enforce certain maximum or minimum target airspeeds, enforce certain maximum or minimum target altitudes, or otherwise.

Figure 2A:
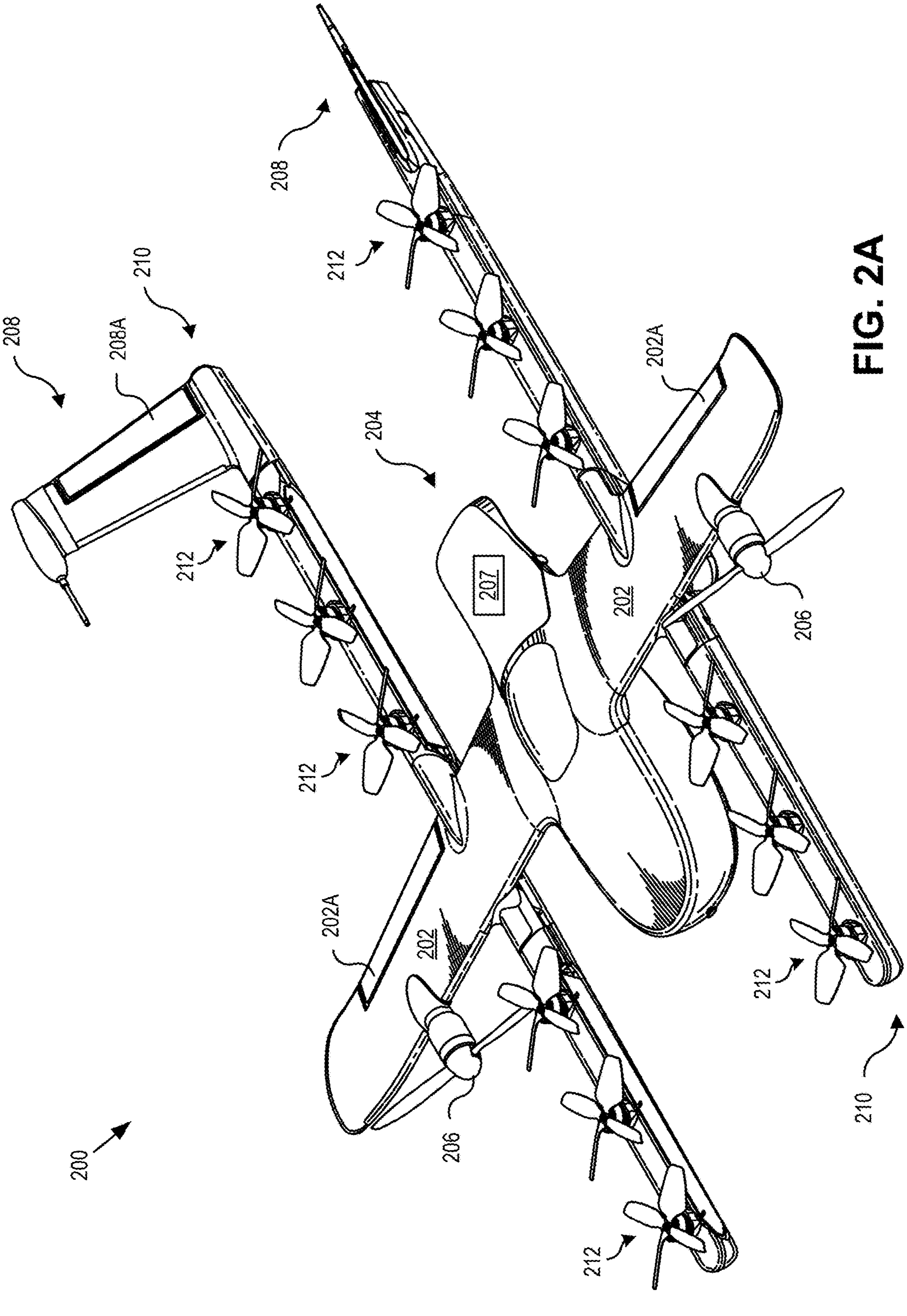
FIG. 2A is a perspective view illustration of a UAV configured for use in a UAV delivery system, in accordance with an embodiment of the disclosure.
Figure 2B:
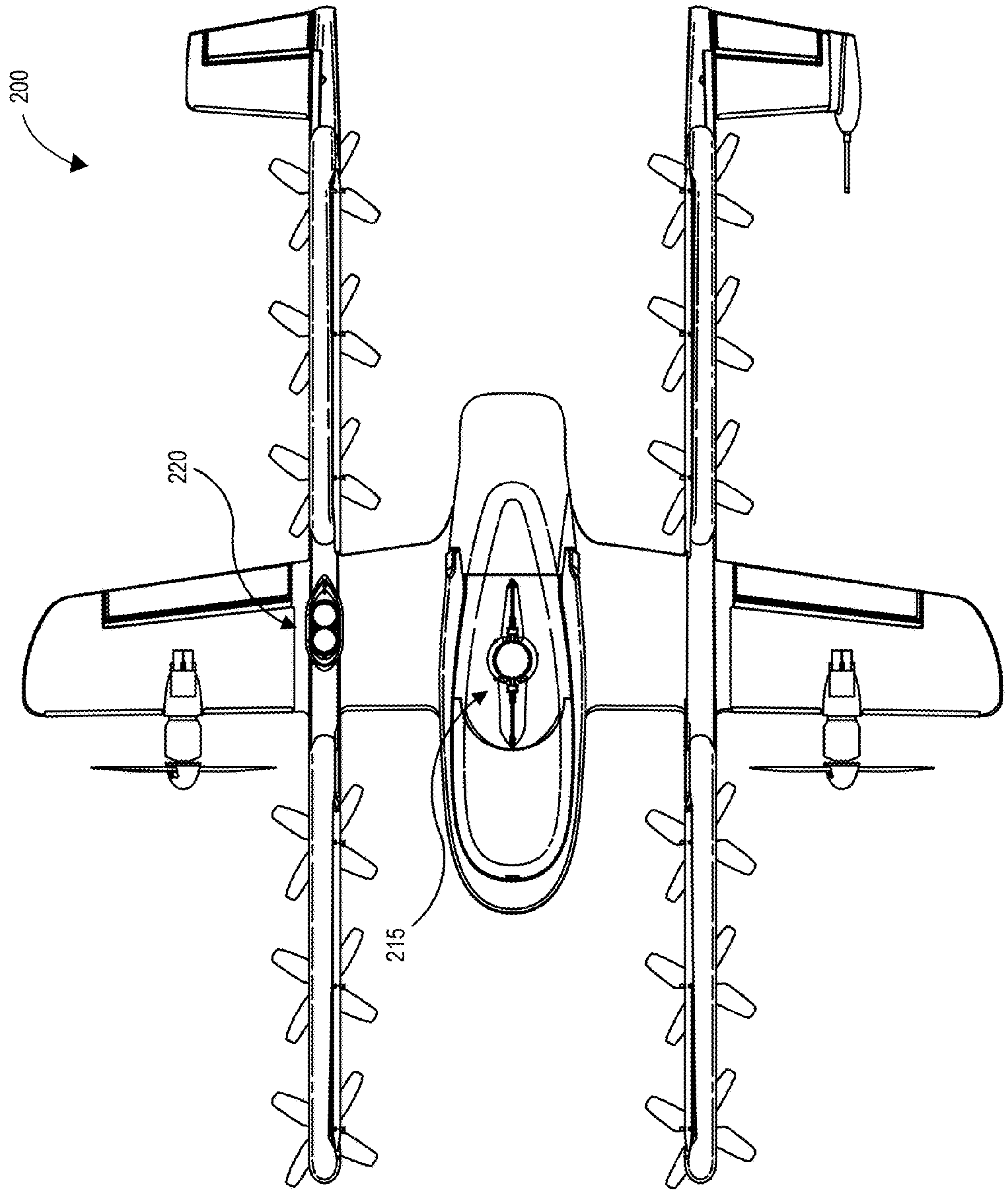
FIG. 2B is an underside plan view illustration of the UAV configured for use in the UAV delivery system, in accordance with an embodiment of the disclosure.

FIGS. 2A and 2B illustrate an example UAV 200 that is well suited for delivery of packages, in accordance with an embodiment of the disclosure. FIG. 2A is a topside perspective view illustration of UAV 200 while FIG. 2B is a bottom side plan view illustration of the same. UAV 200 is one possible implementation of UAVs 105 illustrated in FIG. 1, although other types of UAVs may be implemented as well.

The illustrated embodiment of UAV 200 is a vertical takeoff and landing (VTOL) UAV that includes separate propulsion units 206 and 212 for providing horizontal and vertical propulsion, respectively. UAV 200 is a fixed-wing aerial vehicle, which as the name implies, has a wing assembly 202 that can generate lift based on the wing shape and the vehicle's forward airspeed when propelled horizontally by propulsion units 206. The illustrated embodiment of UAV 200 has an airframe that includes a fuselage 204 and wing assembly 202. In one embodiment, fuselage 204 is modular and includes a battery module, an avionics module, and a mission payload module. These modules are secured together to form the fuselage or main body.

The battery module (e.g., fore portion of fuselage 204) includes a cavity for housing one or more batteries for powering UAV 200. The avionics module (e.g., aft portion of fuselage 204) houses flight control circuitry of UAV 200, which may include a processor and memory, communication electronics and antennas (e.g., cellular transceiver, wifi transceiver, etc.), and various sensors (e.g., global navigation satellite system (GNSS) sensors, an inertial measurement unit (IMU), a magnetic compass, a radio frequency identifier reader, etc.). Collectively, these functional electronic subsystems for controlling UAV 200, communicating, and sensing the environment may be referred to as an onboard control system 207. The mission payload module (e.g., middle portion of fuselage 204) houses equipment associated with a mission of UAV 200. For example, the mission payload module may include a payload actuator 215 (see FIG. 2B) for dispensing and recoiling a line when picking up a package during a package delivery mission. In some embodiments, the mission payload module may include camera/sensor equipment (e.g., camera, lenses, radar, lidar, pollution monitoring sensors, weather monitoring sensors, scanners, etc.). In FIG. 2B, an onboard camera system 220 is mounted to the underside of UAV 200 to support a machine vision system (e.g., monovision frame camera, stereoscopic machine vision, event camera, lidar depth camera, etc.) for visual triangulation, localization, and navigation as well as operate as an optical code scanner for reading visual codes affixed to packages.

As illustrated, UAV 200 includes horizontal propulsion units 206 positioned on wing assembly 202 for propelling UAV 200 horizontally. UAV 200 further includes two boom assemblies 210 that secure to wing assembly 202. Vertical propulsion units 212 are mounted to boom assemblies 210. Vertical propulsion units 212 providing vertical propulsion. Vertical propulsion units 212 may be used during a hover mode where UAV 200 is descending (e.g., to a delivery location), ascending (e.g., at initial launch or following a delivery), or maintaining a constant altitude. Stabilizers 208 (or tails) may be included with UAV 200 to control pitch and stabilize the aerial vehicle's yaw (left or right turns) during cruise. In some embodiments, during cruise mode vertical propulsion units 212 are disabled or powered low and during hover mode horizontal propulsion units 206 are disabled or powered low.

During flight, UAV 200 may control the direction and/or speed of its movement by controlling its pitch, roll, yaw, and/or altitude. Thrust from horizontal propulsion units 206 is used to control air speed. For example, the stabilizers 208 may include one or more rudders 208A for controlling the aerial vehicle's yaw, and wing assembly 202 may include elevators for controlling the aerial vehicle's pitch and/or ailerons 202A for controlling the aerial vehicle's roll. While the techniques described herein are particularly well-suited for VTOLs providing an aerial delivery service, it should be appreciated that embodiments are not thus limited.

Many variations on the illustrated fixed-wing aerial vehicle are possible. For instance, aerial vehicles with more wings (e.g., an "x-wing" configuration with four wings), are also possible. Although FIGS. 2A and 2B illustrate one wing assembly 202, two boom assemblies 210, two horizontal propulsion units 206, and six vertical propulsion units 212 per boom assembly 210, it should be appreciated that other variants of UAV 200 may be implemented with more or less of these components.

It should be understood that references herein to an "unmanned" aerial vehicle or UAV can apply equally to autonomous and semi-autonomous aerial vehicles. In a fully autonomous implementation, all functionality of the aerial vehicle is automated; e.g., pre-programmed or controlled via real-time computer functionality that responds to input from various sensors and/or pre-determined information. In a semi-autonomous implementation, some functions of an aerial vehicle may be controlled by a human operator, while other functions are carried out autonomously. Further, in some embodiments, a UAV may be configured to allow a remote operator to take over functions that can otherwise be controlled autonomously by the UAV. Yet further, a given type of function may be controlled remotely at one level of abstraction and performed autonomously at another level of abstraction. For example, a remote operator may control high level navigation decisions for a UAV, such as specifying that the UAV should travel from one location to another (e.g., from a warehouse in a suburban area to a delivery address in a nearby city), while the UAV's navigation system autonomously controls more fine-grained navigation decisions, such as the specific route to take between the two locations, specific flight controls to achieve the route and avoid obstacles while navigating the route, and so on.

Figure 3:
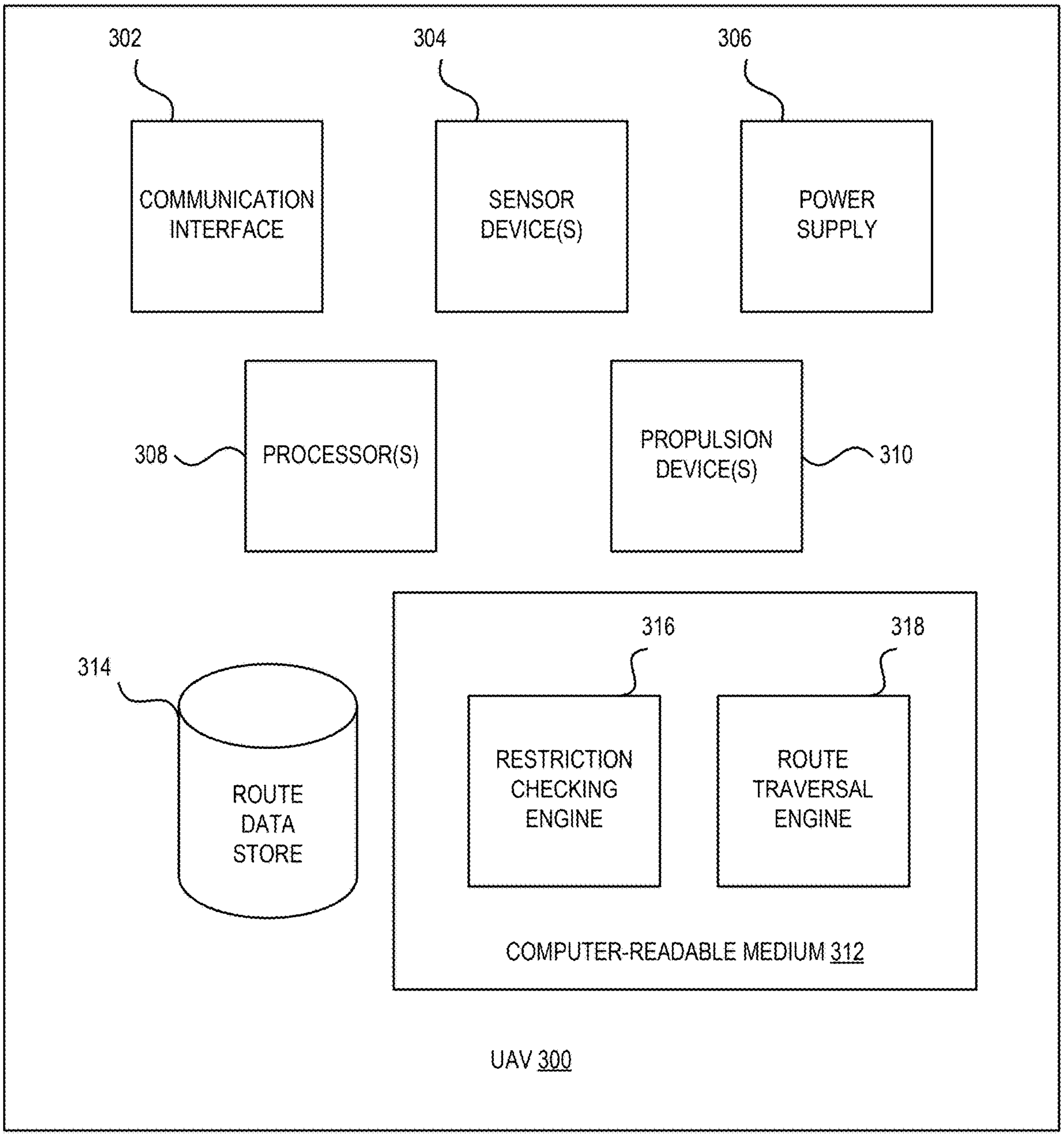
FIG. 3 is a functional block diagram that illustrates a non-limiting example embodiment of a UAV according to various aspects of the present disclosure.

FIG. 3 is a functional block diagram that illustrates a non-limiting example embodiment of a UAV 300 according to various aspects of the present disclosure. UAV 300 is one possible implementation of UAVs 105 or 200. As shown, the UAV 300 includes a communication interface 302, one or more sensor devices 304, a power supply 306, one or more processors 308, one or more propulsion devices 310, a computer-readable medium 312, and a route data store 314.

In some embodiments, the communication interface 302 includes hardware and software to enable any suitable communication technology for communicating with a fleet management system. In some embodiments, the communication interface 302 includes multiple communication interfaces, each for use in appropriate circumstances. For example, the communication interface 302 may include a long-range wireless interface such as a 4G or LTE interface, or any other type of long-range wireless interface (e.g., 2G, 3G, 5G, or WiMAX), to be used to communicate with the fleet management system while traversing a route (also referred to as a flight mission). The communication interface 302 may also include a medium-range wireless interface such as a Wi-Fi interface to be used when the UAV 300 is at an area near a start location or an endpoint where Wi-Fi coverage is available. The communication interface 302 may also include a short-range wireless interface such as a Bluetooth interface to be used when the UAV 300 is in a maintenance location or is otherwise stationary and waiting to be assigned a route. The communication interface 302 may also include a wired interface, such as an Ethernet interface or a USB interface, which may also be used when UAV 300 is in a maintenance location or is otherwise stationary and waiting to be assigned a route.

In some embodiments, the sensor devices 304 include one or more vehicle state sensor devices that are configured to detect states of various components of the UAV 300, and to transmit signals representing those states to other components of the UAV 300. Some non-limiting examples of such sensor devices 304 include a battery state sensor, a propulsion device health sensor, an accelerometer, an attitude sensor, or otherwise. In some embodiments, the sensor devices 304 include one or more environmental sensor devices that are configured to detect information regarding the environment of UAV 300. Some non-limiting examples of such sensor devices 304 include visible light cameras, infrared cameras, LIDAR sensor devices, RADAR sensor devices, SONAR sensor devices, temperature sensors, altimeters, barometers, and positioning sensor devices (including but not limited to global navigation satellite system (GNSS) sensors).

In some embodiments, the power supply 306 may be any suitable device or system for storing and/or generating power. Some non-limiting examples of a power supply 306 include one or more batteries, one or more solar panels, a fuel tank, and combinations thereof. In some embodiments, the propulsion devices 310 may include any suitable devices for causing the UAV 300 to travel along the route, such as those described in connection with FIGS. 2A and 2B.

In some embodiments, the processors 308 may include any type of computer processor capable of receiving signals from other components of the UAV 300 and executing instructions stored on the computer-readable medium 312. In some embodiments, the computer-readable medium 312 may include one or more devices capable of storing information for access by the processor 308. In some embodiments, the computer-readable medium 312 may include one or more of a hard drive, a flash drive, an EEPROM, and combinations thereof.

As shown, the computer-readable medium 312 has stored thereon a route traversal engine 318 and a restriction checking engine 316. In some embodiments, the route traversal engine 318 is configured to cause the propulsion device 310 to propel the UAV 300 along routes stored in the route data store 314. The route traversal engine 318 may use signals from sensor devices 304, such as GNSS sensor devices, vision-based navigation devices, accelerometers, LIDAR devices, and/or other devices that are not illustrated or described further herein, to assist in positioning and navigation as is typical for UAV 300. In some embodiments, the restriction checking engine 316 is configured to compare a current or predicted future position of the UAV 300 to one or more airspace restrictions, and to cause UAV 300 to take a corrective action in response to determining that the current or predicted future position of the UAV 300 is or will be within the restricted airspace.

As used herein, "engine" refers to logic embodied in hardware or software instructions, which can be written in one or more programming languages, including but not limited to C, C++, C#, COBOL, JAVA™, PHP, Perl, HTML, CSS, JavaScript, VBScript, ASPX, Go, and Python. An engine may be compiled into executable programs or written in interpreted programming languages. Software engines may be callable from other engines or from themselves. Generally, the engines described herein refer to logical modules that can be merged with other engines, or can be divided into sub-engines. The engines can be implemented by logic stored in any type of computer-readable medium or computer storage device and be stored on and executed by one or more general purpose computers, thus creating a special purpose computer configured to provide the engine or the functionality thereof. The engines can be implemented by logic programmed into an application-specific integrated circuit (ASIC), a field-programmable gate array (FPGA), or another hardware device.

As used herein, "data store" refers to any suitable device configured to store data for access by a computing device. One example of a data store is a highly reliable, high-speed relational database management system (DBMS) executing on one or more computing devices and accessible over a high-speed network. Another example of a data store is a key-value store. However, any other suitable storage technique and/or device capable of quickly and reliably providing the stored data in response to queries may be used, and the computing device may be accessible locally instead of over a network, or may be provided as a cloud-based service. A data store may also include data stored in an organized manner on a computer-readable storage medium, such as a hard disk drive, a flash memory, RAM, ROM, or any other type of computer-readable storage medium. One of ordinary skill in the art will recognize that separate data stores described herein may be combined into a single data store, and/or a single data store described herein may be separated into multiple data stores, without departing from the scope of the present disclosure.

Figure 4:
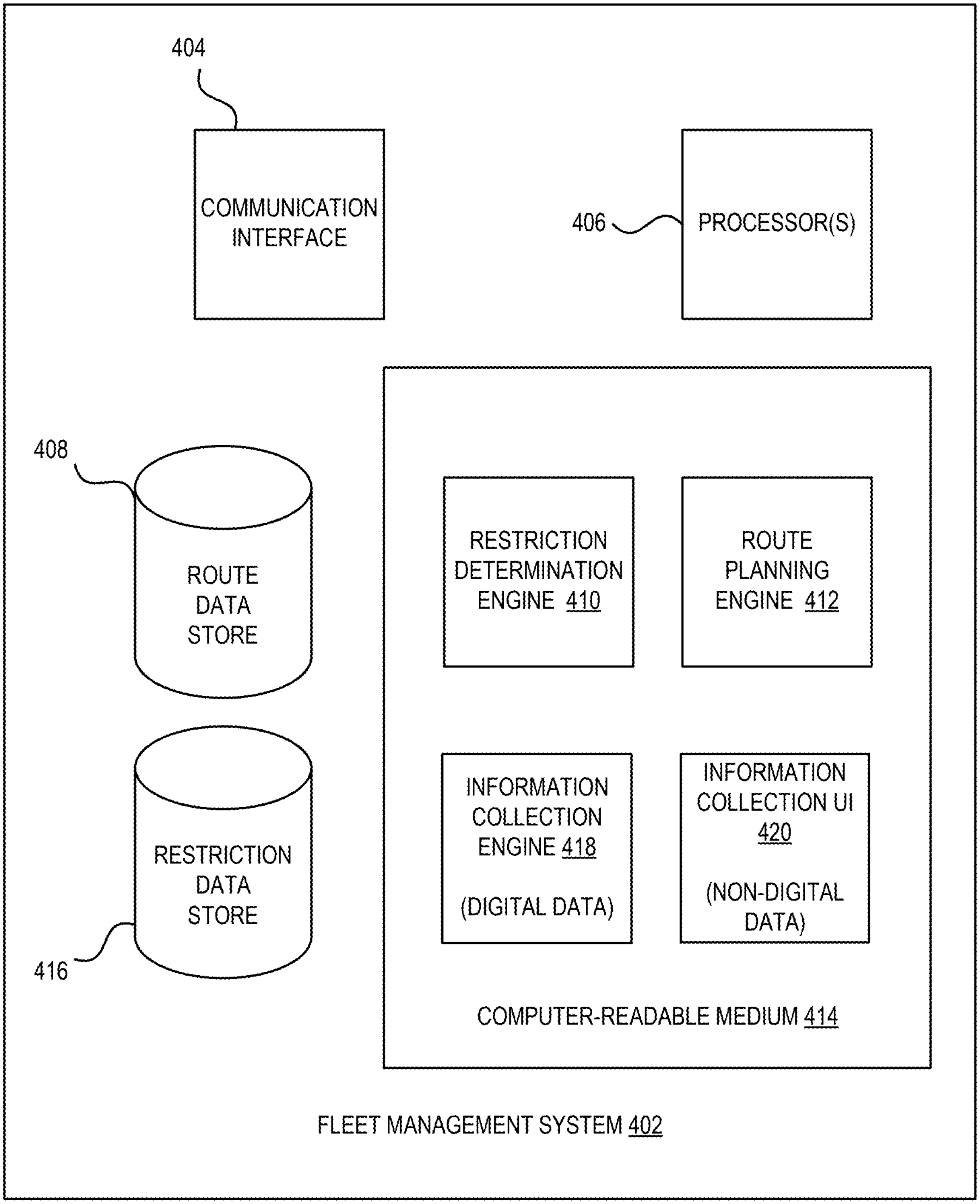
FIG. 4 is a functional block diagram that illustrates a non-limiting example embodiment of a fleet management system according to various aspects of the present disclosure.

FIG. 4 is a functional block diagram that illustrates a non-limiting example embodiment of a fleet management system 402 according to various aspects of the present disclosure. Fleet management system 402 may include any number of one or more suitable computing devices configured to collectively provide the functionality of fleet management system 402, including but not limited to desktop computing devices, laptop computing devices, server computing devices, and computing devices of a cloud computing system. In some embodiments, each of the computing devices of fleet management system 402 may have all of the components illustrated in FIG. 4. In some embodiments, some computing devices of fleet management system 402 may have some (but not all) of the components illustrated in FIG. 4, while other computing devices of fleet management system 402 may have other components illustrated in FIG. 4.

As shown, fleet management system 402 includes a communication interface 404, one or more processors 406, and a computer-readable medium 414. In some embodiments, processors 406 include any suitable type of general-purpose computer processor, but may also include one or more special-purpose computer processors or AI accelerators optimized for specific computing tasks, including but not limited to graphical processing units (GPUs), vision processing units (VPUs), and tensor processing units (TPUs). In some embodiments, the communication interface 404 includes hardware and/or software suitable for communication with a communication interface 302 as described above of the autonomous vehicles 300 in a fleet. In some embodiments, communication interface 404 may also include hardware and/or software suitable for communicating with other computing systems via one or more of any wired or wireless technologies.

As shown, the computer-readable medium 414 has stored thereon logic for providing a restriction determination engine 410, a route planning engine 412, an information collection engine 418, and an information collection UI 420. In some embodiments, the restriction determination engine 410 is configured to determine airspace in which operation of UAVs 300 is in some way restricted or limited, and may be configured to transmit such airspace restrictions to UAVs 300 and/or may be configured to store entries related to such airspace restrictions in a restriction data store 416. In some embodiments, the route planning engine 412 is configured to plan routes (e.g., flight missions) for UAV 300, to store the planned routes in a route data store 408, and to transmit the planned routes to UAVs 300. In some embodiments, the route planning engine 412 may take the airspace restrictions stored in the restriction data store 416 into account while planning routes.

Information relevant for determining and generating airspace restrictions may be collected from various sources. In some scenarios, the information source is a digital data source collected in an automated manner by information collection engine 418. An example digital data source is an Automatic Dependent Surveillance-Broadcast (ADS-B), radar feeds, GNSS feeds, etc. The digital data source feeds may be collected/filtered by information collection engine 418 and provided to restriction determination engine 410. In turn, restriction determination engine 410 automatically generates airspace restrictions based upon these digital data feeds and either creates new entries in restriction data store 416 or modifies existing entries in restriction data store 416 based upon the digital data feeds. For non-digital data sources, or data feeds that otherwise require human supervision, interpretation, or intervention, information collection UI 420 is provided. Information collection UI 420 is a software tool provided to a human supervisor operating in a call center or otherwise monitoring information feeds that impact airspace operations. Information collection UI 420 facilitates the efficient creation/modification of airspace restrictions by human supervisors based upon information sources not readily amenable to automated ingestion and analysis by information collection engine 418 and restriction determination engine 410. The airspace restrictions created/modified with information collection UI 420 may also be stored as entries in restriction data store 416. As mentioned, an example category of information for which information collection UI 420 is well-suited is non-digital data, such as voice communications monitored on aircraft band (e.g., VHF allocated to civil aviation) or phone calls received by a call center or hotline. Of course, information collection UI 420 may be used to create/modify airspace restrictions based upon other types or categories of information as well.

Figure 5:
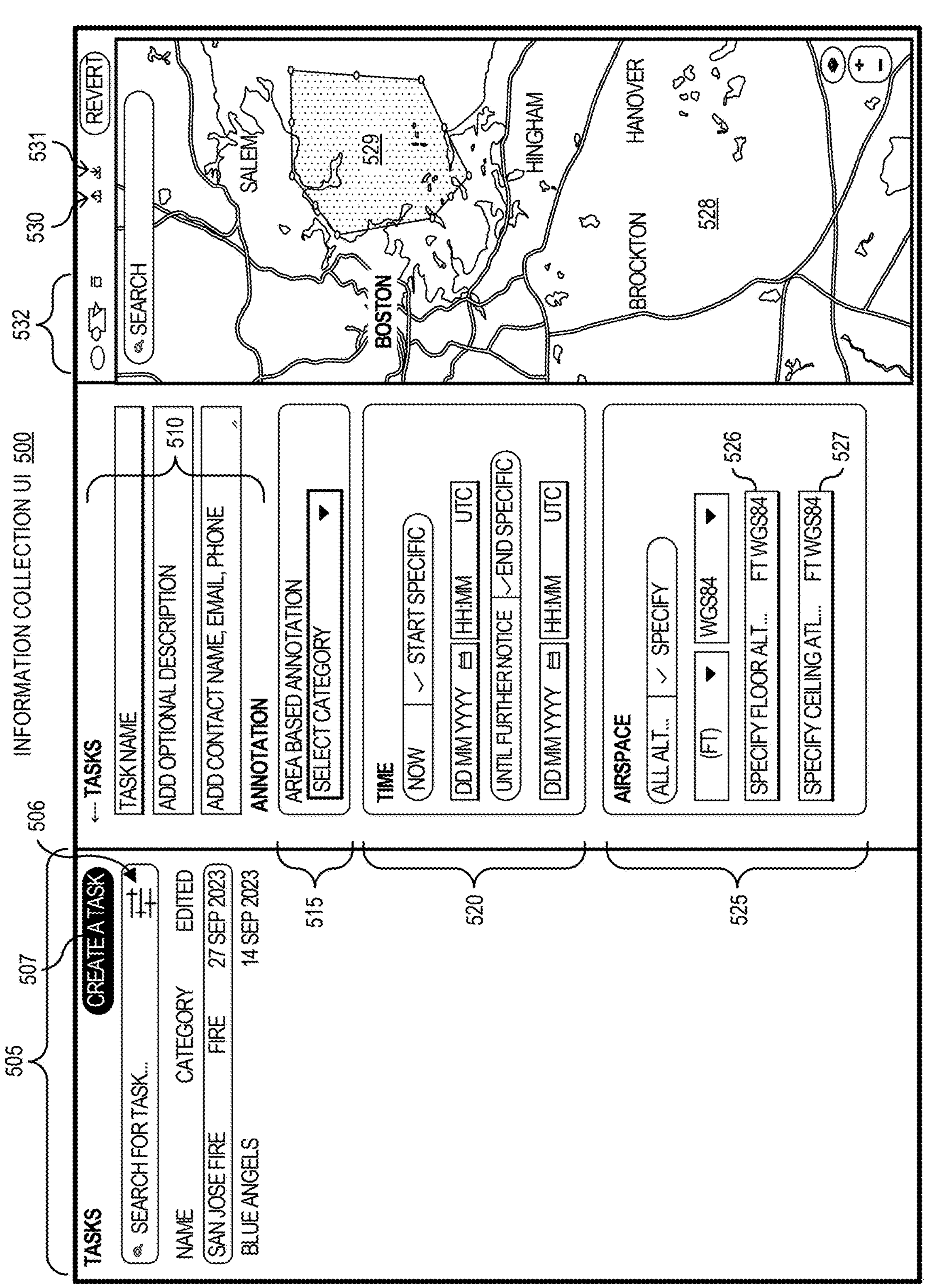
FIG. 5 illustrates an example information collection user-interface (UI), in accordance with an embodiment of the disclosure.

FIG. 5 illustrates an example information collection UI 500, in accordance with an embodiment of the disclosure. Information collection UI 500 is one possible implementation of information collection UI 420. The illustrated embodiment of information collection UI 500 includes a task list field 505, description fields 510, a selectable field 515, duration fields 520, and location fields 525. The illustrated embodiment of location fields 525 includes floor and ceiling altitude fields 526 and 527 along with a two-dimensional (2D) map 528.

Figure 7A:
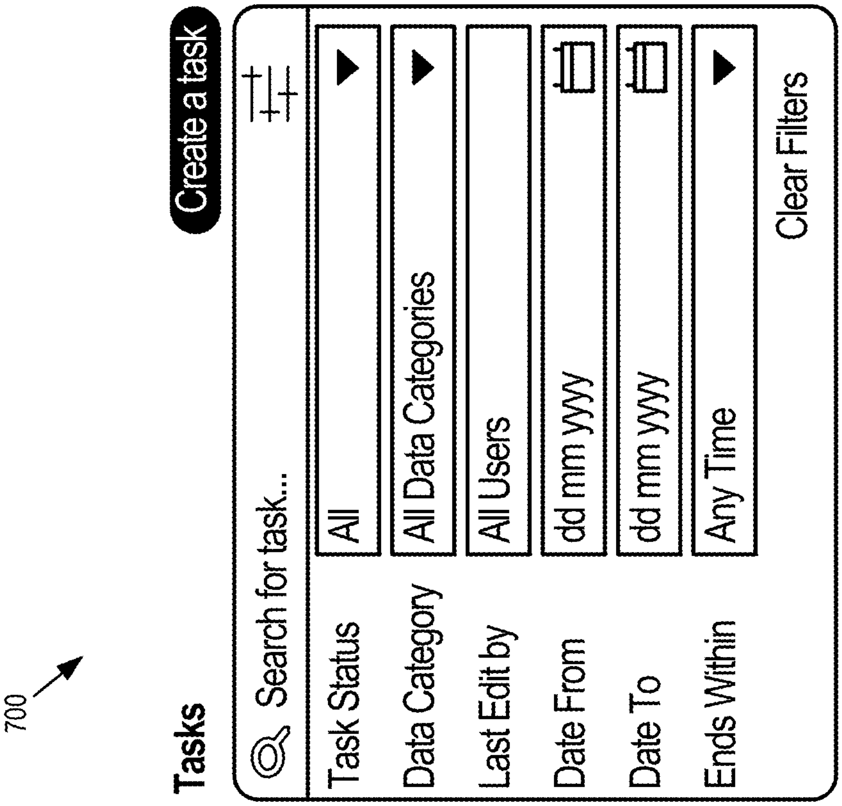
FIG. 7A illustrates an example task list field of the UI for searching and filtering existing airspace restrictions, in accordance with an embodiment of the disclosure.

In the illustrated embodiment, task list field 505 is displayed within information collection UI 500 adjacent to description fields 510, selectable field 515, duration fields 520, and location fields 525. Task list field 505 includes a list of existing airspace restrictions (e.g., "San Jose Fire" and "Blue Angels") previously created and entered into restriction data store 416. The software entries in restriction data store 416 for each airspace restriction are also referred to herein as a "tasks." The human supervisor can select an existing task to edit or modify the airspace restriction associated with the task. In the illustrated embodiment, organization of the tasks is provided by a filter option 506 that when selected displays a filter menu 700. Referring to FIG. 7A, filter menu 700 includes a number of user selectable options to filter existing tasks. In the illustrated embodiment, these filter options include a task status (e.g., not yet active, active, expired), a data category (i.e., restriction type as discussed below), last edited by, active date ranges, or ends with a specified date/time range. These filters can help human supervisors quickly find and edit existing tasks (i.e., entries stored in restriction data store 416). When a user does edit an existing task, information collection UI 500 may display an update log 710 (see FIG. 7C) that tracks when and by whom changes were made and enables the human supervisor to include notes describing the reason for each change. Returning to FIG. 5, task list field 505 further includes a create task option 507 to create a new task for a new airspace restriction.

Upon selecting an existing task or selecting the create task option 507, the human supervisor is able to populate or edit description fields 510, selectable field 515, duration fields 520, and location fields 525 for the existing/new task. In the illustrated embodiment, description fields 510 are text fillable description fields that enable the human supervisor to input a descriptive name for the airspace restriction, an optional description (e.g., Massachusetts Bay Airshow), and contact information related to the airspace restriction (e.g., name and phone number of the person, government agency/official, or otherwise that reported the restriction). In other words, the description fields 510 provide a space for describing the obstacle or event causing the airspace restriction and contact information for a relevant stakeholder.

Figure 7B:
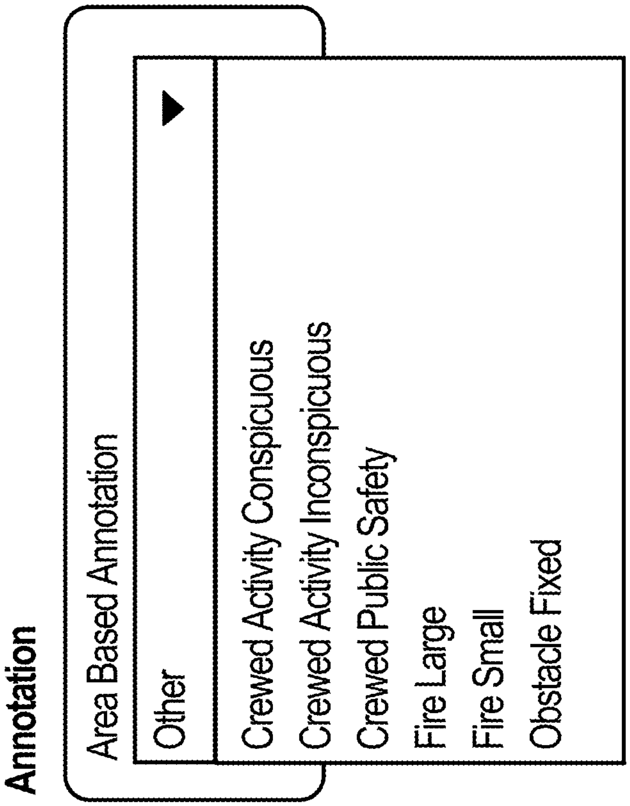
FIG. 7B illustrates an example selectable field of the UI for soliciting a restriction type that defines when or how the airspace restriction is implemented by a fleet of UAVs, in accordance with an embodiment of the disclosure.
Figure 7C:
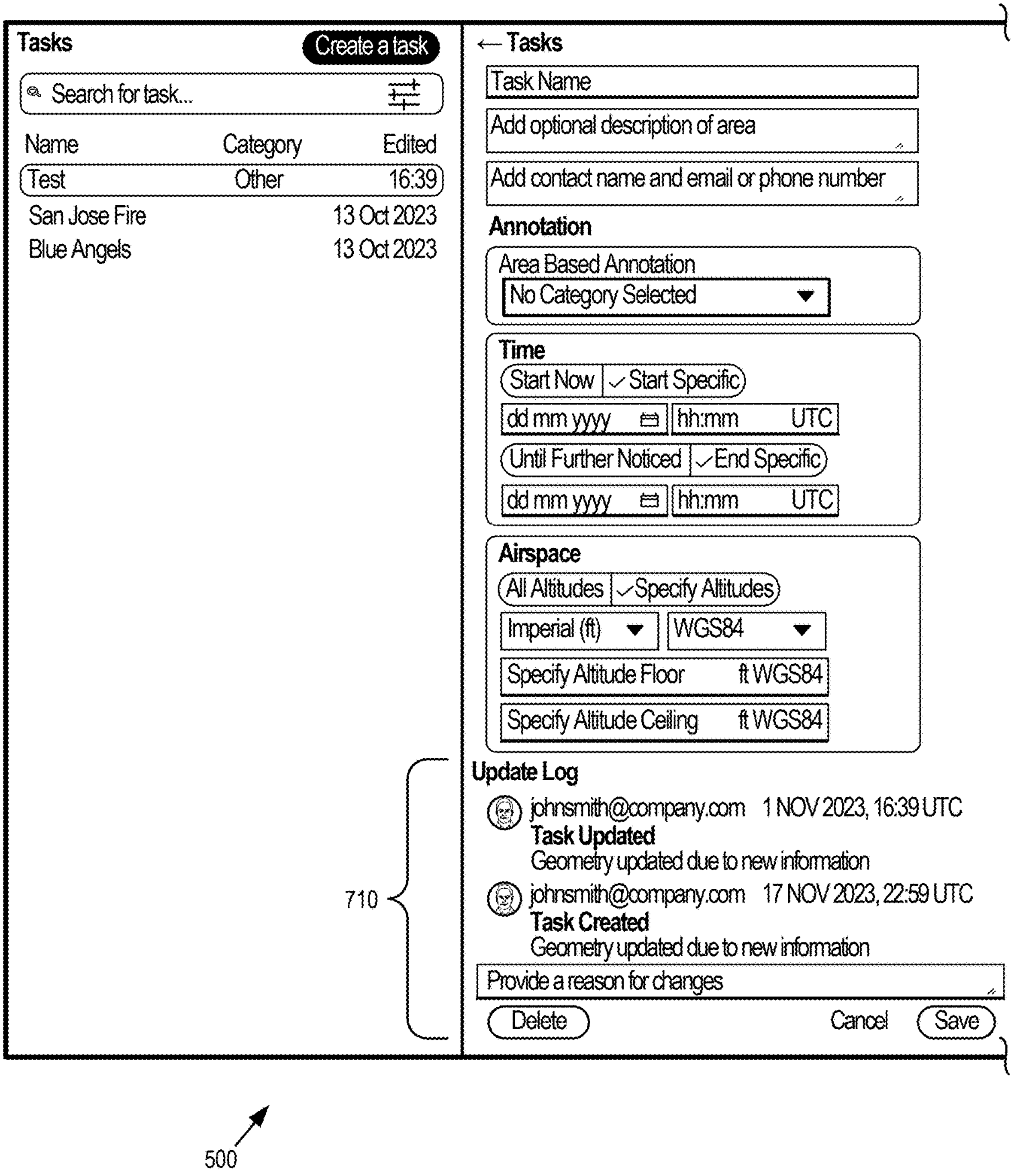
FIG. 7C illustrates an example log field of the UI for tracking changes to a given airspace restriction, in accordance with an embodiment of the disclosure.

The selectable field 515, duration fields 520, and location fields 525 are further annotation fields describing characteristics of the airspace restriction. In the illustrated embodiment, selectable field 515 is a drop-down menu (e.g., see FIG. 7B) that enables the user to select a restriction type (also referred to as a restriction data type) from a plurality of available restriction types for the airspace restriction. The restriction types define when or how the airspace restriction is to be implemented by the fleet of UAVs 105 for a particular category of airspace restriction. As illustrated in FIG. 7B, example restriction types may include small or large fires, crewed aircraft (both conspicuous aircraft having an ADS-B transmitter and inconspicuous crewed aircraft not having ADS-B transmitters), fixed ground-based obstacles, or otherwise.

The restriction type is an efficient mechanism for defining a plurality of distinct characteristics related to how and when an airspace restriction is implemented with a single quick user selection. The various available restriction types may define when the airspace restriction is "implemented" dependent upon mission phases and/or planning phases for each UAV 105 in the fleet. For example, each restriction type may define an "implementation start time" for the airspace restriction dependent upon one, two, or more of the following mission/planning phases: (1) whether a given flight mission is being newly planned by route planning engine 412, (2) whether a given flight mission is already planned but not yet in progress upon creation of the task, (3) whether a given flight mission is in progress by a given UAV 105, or (4) whether a given flight mission is in progress by a UAV 105 and the particular UAV 105 is or isn't currently violating the airspace restriction. Accordingly, a single airspace restriction may have variable implementation times that depend upon the particular planning or mission phase of given flight mission.

The restriction type may also define a priority level for promulgating the airspace restriction out to the fleet. For example, airspace restrictions may have two or more priority levels (e.g., low priority and high priority). In response to the human supervisor selecting one of the available restriction types having a high priority designation, the airspace restriction may be wirelessly communicated to UAVs 105 currently executing flight missions in the vicinity of the airspace restriction. However, if the selected restriction type has an associated low priority designation, then the task is created in restriction data store 416 for future flight missions planned by route planning engine 412, but is not wirelessly communicated to UAVs 105 currently executing flight missions for immediate implementation.

In addition to defining when to implement an airspace restriction, selection of the restriction type may also specify how to implement an airspace restriction. How to implement the restriction type may include one or more of a land now command, a fly around command, a maximum or a minimum target airspeed command, a maximum or minimum target altitude command, or otherwise. If the selected restriction type is associated with a land now command, then any UAV 105 operating within the restricted airspace would be instructed to immediately land. If the selected restriction type is associated with a fly around command, then UAVs 105 would be instructed to immediately vacate the restricted airspace (if operating within it) and then navigate around the restricted airspace. If the selected restriction type is associated with a maximum or minimum target airspeed command, then UAVs 105 operating within the restricted airspace would be instructed to abide by the target airspeed constraint. If the selected restriction type is associated with a maximum or minimum target altitude command, then UAVs 105 operating within the restricted airspace would be instructed to abide by the altitude constraint.

Selection of the restriction type may also define other how-tos. For example, how to implement the restriction type may also include one or more of a limit density command, limit frequency command, or limit heading command. The limit density command instructs route planning engine 412 and/or route traversal engine 318 of each UAV 300 to plan or implement routes in a manner that limits how many UAVs of the fleet may simultaneously operate within the location of the airspace restriction. Similarly, the limit frequency command instructs route planning engine 412 and/or route traversal engines 318 how often UAVs of the fleet may enter the location of the airspace restriction within a given time period when planning or implementing routes. Finally, limit heading command instructs route planning engine 412 and/or route traversal engines 318 to only plan or execute certain permissible headings when operating within the location of the airspace restriction.

As seen from the above discussion, the restriction type, or restriction data type, enables the human supervisor to select a category for the airspace restriction. The categories are then associated with a number of characteristics for implementing the airspace restriction including how and when to implement the airspace restriction by route traversal engine 318 within each UAV 300 and/or how and when to plan future flight missions by route planning engine 412. When a human supervisor is monitoring real-time aviation voice communications or receives an urgent call from a stakeholder, a single, quick user selection can specify a multitude of actions defining how and when to implement the airspace restriction.

Returning to FIG. 5, duration fields 520 are presented within information collection UI 500 to solicit start and end times for the airspace restriction. The start and end times indicate the persistence period for the airspace restriction itself. The start and end times solicited in the duration fields 520 are distinct temporal information from the "when to implement" information determined by selecting an available restriction type in selectable field 515. The "when to implement" is conditional instructions that can vary dependent upon priority levels and mission or planning phases. In contrast, the persistence period is the same regardless of priority level or mission/planning phase. In one embodiment, the start time defaults to "start now" while the end time defaults to "until further notice." Either of these default selections can be modified to a specific start or end time input by the human supervisor. Selecting the start specific or stop specific option, displays date and time fields to receive such information.

Location fields 525 are presented within information collection UI 500 to solicit location information for the airspace restriction. The illustrated embodiment of location fields 525 not only include floor and ceiling altitude fields 526 and 527, but also include a 2D map 528 upon which a shape 529 may be drawn to define x-y axis boundaries (i.e., longitude/latitude boundaries) of the location of the airspace restriction. The floor and ceiling fields are provided to define the z axis boundaries (i.e., altitude boundaries). The floor and ceiling fields may optionally be specified as an above ground level (AGL) value or a mean sea level (MSL) value. The 2D map 528 further provides drawing tools 532 to facilitate quick drawing of the x-y axis boundaries. These drawing tools 532 may include an option to select a scalable geometric shape (e.g., circle, oval, various polygons, etc.) or manually draw a polygon. A user drawn polygon may be saved by selecting a save shape option 530 and automatically redrawn or reused when creating another airspace restriction by selecting a recall shape option 531.

Figure 6:
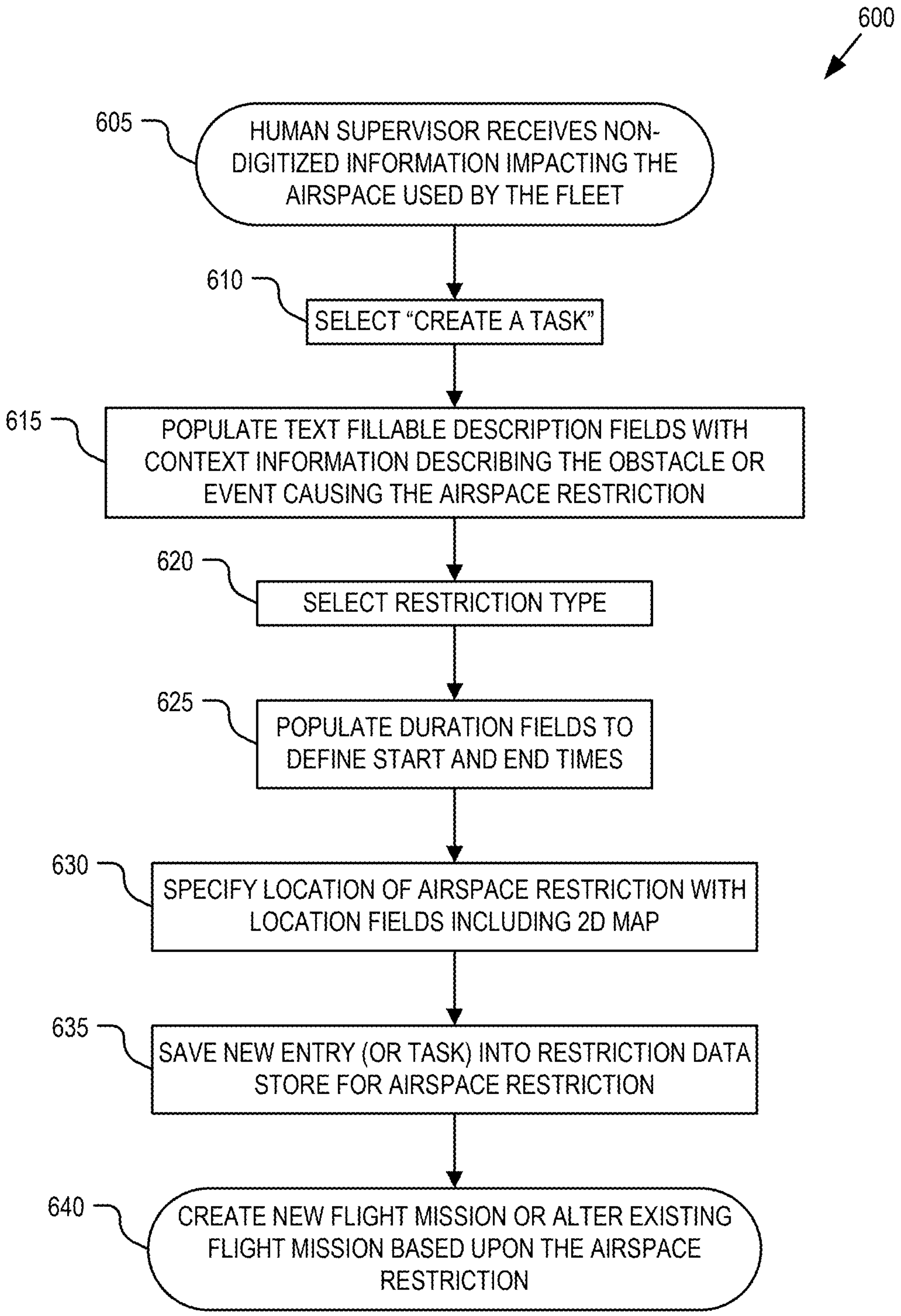
FIG. 6 is a flow chart illustrating operation of an information collection UI for creating airspace restrictions based upon non-digitized information, in accordance with an embodiment of the disclosure.

FIG. 6 is a flow chart illustrating a process 600 for operation of information collection UI 500 (or 420) for the creation of an airspace restriction based upon non-digitized information, in accordance with an embodiment of the disclosure. Process 600 is described with reference to FIG. 5. The order in which some or all of the process blocks appear in process 600 should not be deemed limiting. Rather, one of ordinary skill in the art having the benefit of the present disclosure will understand that some of the process blocks may be executed in a variety of orders not illustrated, or even in parallel.

In a process block 605, a human supervisor working for the aerial delivery service receives information impacting the airspace used by the fleet of UAVs 105. The information may be non-digitized information, such as voice-based communications from monitoring aviation VHF or the receipt of a phone call from a $3^{rd}$ party stakeholder (e.g., government agency, industry stakeholder, member of the public, etc.). In response, the human supervisor selects "create a task" within information collection UI 500 to commence creation of a new airspace restriction that will be saved as a new entry in restriction data store 416 (process block 610).

Once a new task for the airspace restriction is opened, the human supervisor can populate description fields 510 with a task name, contact information for an individual, company or agency reporting the obstacle/event causing the airspace restriction, and an optional description of the obstacle or event itself (process block 615). Example optional description could be "temporary Ferris wheel erected for the Santa Clara County Fair" or "US Navy Blue Angels demonstration flight for Seattle Sea Fair."

In a process block 620, the human supervisor selects a restriction data type from the drop down list of available restriction types (see FIG. 7B). In the example of a Ferris wheel, the restriction data type may be Obstacle Fixed, illustrated in FIG. 7B, indicating this is a stationary ground based obstacle. In the example of the Blue Angels demonstration flight, the restriction data type may be Crewed Activity Conspicuous indicating manned aircraft with ADS-B transmitters are flying in the vicinity. Selection of the restriction data type will automatically specify how and when the airspace restriction is implemented, as described above.

In a process block 625, the human supervisor inputs the start and end times of the airspace restriction into duration fields 520. Specific start and end times (e.g., date and time) may be input, or the values of "now" and "until further notice" may be selected by default. In a process block 630, the location of the airspace restriction is input into location fields 525. The location may be input by drawing a 2D shape on 2D map 528 and specifying floor and ceiling altitudes. Alternatively, an "all altitudes" option may be selected by default.

Once all relevant information is input into information collection UI 500, the new entry is saved into restriction data store 416 (process block 635). The new airspace restriction is then referenced by route planning engine 412 when planning new flight missions (process block 640). Depending upon the restriction data type selected in process block 620, the new airspace restriction may be pushed out to UAVs 105 to update preplanned flight missions or flight missions in progress by route traversal engines 318 within each UAV 105.

The processes explained above are described in terms of computer software and hardware. The techniques described may constitute computer-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible machine-readable storage medium includes any mechanism that provides (i.e., stores) information in a non-transitory form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A method for managing an airspace used by a fleet of unmanned aerial vehicles (UAVs), the method comprising:
- presenting, by a fleet management system, a user interface (UI) adapted for creating an airspace restriction based on non-digitized information received by a human supervisor of the fleet management system and input into the UI by the human supervisor, wherein the airspace restriction places a limitation on a use of the airspace by the fleet;
- soliciting, with a selectable field of the UI, a restriction type for the airspace restriction from a plurality of available restriction types, wherein the available restriction types define when or how the airspace restriction is implemented by the fleet;
- soliciting, with duration fields of the UI, start and end times for the airspace restriction;
- soliciting, with location fields of the UI, a location of the airspace restriction;
- creating a new entry for the airspace restriction in a restriction data store of the fleet management system based on the selectable, duration, and location fields;
- creating a new flight mission or altering an existing flight mission based at least in part upon the new entry for the airspace restriction; and
- controlling at least one of the UAVs based at least in part on the created new flight mission or the altered existing flight mission,
- wherein the UI contemporaneously displays:
  - a task list field for displaying a list of existing airspace restrictions and selecting from the list of existing airspace restrictions to edit a selected existing airspace restriction; and
  - a map within which two-dimensional (2D) boundaries of the airspace restrictions are displayed and modifiable,
- wherein the selectable, duration, and location fields of the UI are displayed in the UI between the task list field and the map.

2. The method of claim 1, wherein the available restriction types define when the airspace restriction is implemented dependent upon mission phases, such that implementation of the airspace restriction differs between the UAVs operating in different mission phases upon creation of the new entry.

3. The method of claim 2, wherein at least one of the available restriction types defines different implementation start times for the airspace restriction dependent upon at least two or more of:
- whether a given flight mission is being newly planned,
- whether the given flight mission is already planned but not yet in progress,
- whether the given flight mission is in progress by one of the UAVs of the fleet, or
- whether the given flight mission is in progress by the one of the UAVs and the one of the UAVs is currently violating the airspace restriction.

4. The method of claim 2, further comprising:
- in response to the human supervisor selecting one of the available restriction types having a high priority designation, wirelessly communicating the airspace restriction to one or more of the UAVs currently executing flight missions; and
- in response to the human supervisor selecting another one of the available restriction types having a low priority designation, creating the new entry for the airspace restriction in the restriction data store of the fleet management system without wirelessly communicating the airspace restriction to any of the UAVs currently executing the flight missions.

5. The method of claim 1, wherein the available restriction types define how the airspace restriction is navigated by the UAVs of the fleet.

6. The method of claim 5, wherein how the airspace restriction is navigated includes one or more of:
- a land now command,
- a fly around command,
- a maximum, minimum, or target airspeed command when operating within the location of the airspace restriction, or
- a maximum, minimum, or target altitude command when operating within the location of the airspace restriction.

7. The method of claim 5, wherein how the airspace restriction is navigated includes one or more of:
- a limit density command indicating how many of the UAVs of the fleet may simultaneously operate within the location of the airspace restriction,
- a limit frequency command indicating how often the UAVs of the fleet may enter the location of the airspace restriction within a given time period, or
- a limit heading command indicating permissible UAV headings within the location of the airspace restriction.

8. The method of claim 1, wherein the location fields of the UI solicit the location as a shape drawn on a two-dimensional (2D) map along with floor and ceiling altitude fields.

9. The method of claim 8, further comprising:

providing a save shape option in the UI;

saving the shape drawn on the 2D map in response to a user selection of the save shape option;

providing a recall shape option in the UI; and automatically redrawing the shape on the 2D map to recycle the shape when creating another airspace restriction.

10. The method of claim 1, wherein the non-digitized information is received by the human supervisor via a voice-based communication channel external to the fleet management system, and wherein the human supervisor manually enters the non-digitized information via the selectable, duration, or location fields of the UI.

11. The method of claim 1, wherein the UI presents the task list field including a create task option for creating the airspace restriction as a task, and wherein the duration fields of the UI default to a start time of now and an end time of until further notice without user input.

12. The method of claim 1, wherein the restriction type defines different implementation behaviors for the airspace restriction depending on whether a UAV flight mission is in a planning phase or an in-progress execution phase.

13. The method of claim 1, further comprising:

presenting the task list field in the UI adjacent to the selectable, duration, and location fields, the task list field including the list of existing airspace restrictions previously created and stored in the restriction data store of the fleet management system;

sorting the task list based upon filter options presented in the task list field; and editing one of the existing airspace restrictions in response to a user selection of the one of the existing airspace restrictions.

14. The method of claim 1, further comprising:

soliciting, with text fillable description fields of the UI, information describing an obstacle or an event causing the airspace restriction.

15. At least one non-transitory computer-readable medium having logic stored thereon that, in response to execution by one or more processors of a fleet management system, cause the fleet management system to perform operations for managing an airspace used by a fleet of unmanned aerial vehicles (UAVs), the operations comprising:

presenting, by the fleet management system, a user interface (UI) adapted for creating an airspace restriction based on non-digitized information received by a human supervisor of the fleet management system and input into the UI by the human supervisor, wherein the airspace restriction places a limitation on a use of the airspace by the fleet;

soliciting, with a selectable field of the UI, a restriction type for the airspace restriction from a plurality of available restriction types, wherein the available restriction types define when or how the airspace restriction is implemented by the fleet;

soliciting, with duration fields of the UI, start and end times for the airspace restriction;

soliciting, with location fields of the UI, a location of the airspace restriction;

creating a new entry for the airspace restriction in a restriction data store of the fleet management system based on the selectable, duration, and location fields;

creating a new flight mission or altering an existing flight mission based at least in part upon the new entry for the airspace restriction; and controlling at least one of the UAVs based at least in part on the created new flight mission or the altered existing flight mission, wherein the UI contemporaneously displays:

a task list field for displaying a list of existing airspace restrictions and selecting from the list of existing airspace restrictions to edit a selected existing airspace restriction; and a map within which two-dimensional (2D) boundaries of the airspace restrictions are displayed and modifiable, wherein the selectable, duration, and location fields of the UI are displayed in the UI between the task list field and the map.

16. The at least one non-transitory computer-readable medium of claim 15, wherein the available restriction types define when the airspace restriction is implemented dependent upon mission phases, such that implementation of the airspace restriction differs between the UAVs operating in different mission phases upon creation of the new entry.

17. The at least one non-transitory computer-readable medium of claim 16, wherein at least one of the available restriction types defines different implementation start times for the airspace restriction dependent upon at least two or more of:

whether a given flight mission is being newly planned, whether the given flight mission is already planned but not yet in progress, whether the given flight mission is in progress by one of the UAVs of the fleet, or whether the given flight mission is in progress by the one of the UAVs and the one of the UAVs is currently violating the airspace restriction.

18. The at least one non-transitory computer-readable medium of claim 16, the operations further comprising:

in response to the human supervisor selecting one of the available restriction types having a high priority designation, wirelessly communicating the airspace restriction to one or more of the UAVs currently executing flight missions; and in response to the human supervisor selecting another one of the available restriction types having a low priority designation, creating the new entry for the airspace restriction in the restriction data store of the fleet management system without wirelessly communicating the airspace restriction to any of the UAVs currently executing the flight missions.

19. The at least one non-transitory computer-readable medium of claim 15, wherein the available restriction types define how the airspace restriction is navigated by the UAVs of the fleet.

20. The at least one non-transitory computer-readable medium of claim 19, wherein how the airspace restriction is navigated includes one or more of:

a land now command, a fly around command, a maximum, minimum, or target airspeed command when operating within the location of the airspace restriction, or a maximum, minimum, or target altitude command when operating within the location of the airspace restriction.

21. The at least one non-transitory computer-readable medium of claim 19, wherein how the airspace restriction is navigated includes one or more of:

a limit density command indicating how many of the UAVs of the fleet may simultaneously operate within the location of the airspace restriction, a limit frequency command indicating how often the UAVs of the fleet may enter the location of the airspace restriction within a given time period, or a limit heading command indicating permissible UAV headings within the location of the airspace restriction.

22. The at least one non-transitory computer-readable medium of claim 15, wherein the location fields of the UI solicit the location as a shape drawn on a two-dimensional (2D) map along with floor and ceiling altitude fields, the operations further comprising:

providing a save shape option in the UI;

saving the shape drawn on the 2D map in response to a user selection of the save shape option;

providing a recall shape option in the UI; and automatically redrawing the shape on the 2D map to recycle the shape when creating another airspace restriction.

23. The method of claim 10, wherein the non-digitized communication channel comprises at least one of an aviation radio communication channel or a telephone call received by the human supervisor operating within a call-center or command-and-control environment for the fleet of UAVs.

* * * * *